Figure 1:
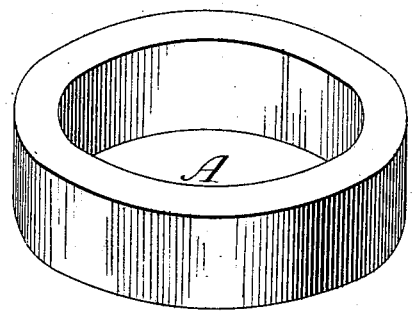
Figure 2:
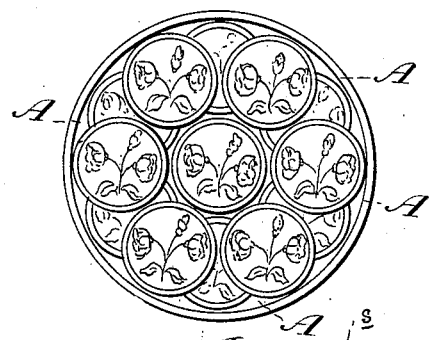
Figure 3:
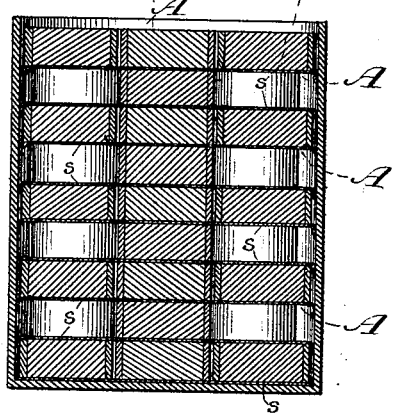
Figure 4:

W. W. RODGERS.
Butter-Package.

No. 215,775.  Patented May 27, 1879.

Attest:
Thomas W. Mack,
C. E. Buckland

Inventor:
William W. Rodgers,
By T. A. Curtis
his Atty

N. PETERS, PHOTO-LITHOGRAPHER, WASHINGTON, D. C.

UNITED STATES PATENT OFFICE.

WILLIAM W. RODGERS, OF HARTLAND, VERMONT, ASSIGNOR TO HIMSELF AND HENRY D. DUNBAR.

IMPROVEMENT IN BUTTER-PACKAGES.

Specification forming part of Letters Patent No. 215,775, dated May 27, 1879; application filed November 20, 1877.

*To all whom it may concern:*

Be it known that I, WILLIAM W. RODGERS, of Hartland, in the State of Vermont, have invented a new and useful Improvement in Packing Butter for Market; and that the following is a full, clear, and exact description thereof, reference being had to the accompanying drawings, making a part of this specification, and to the letters of reference marked thereon.

My invention consists, first, of a ring either cylindrical or polygonal in form, and made from any material that will not be affected by the salt or moisture of the butter, into which ring the butter is filled; and it consists, second, of a series of said rings so filled with butter packed in a suitable tub in layers or tiers, one above another, with cloth or other suitable protecting material placed between the layers to assist in protecting the butter, or preventing any effect of the wood of the tub upon the upper and lower surfaces of the butter, as will be more fully set forth.

Figure I is a perspective view of the ring made to receive the butter. Fig. II is a plan view, showing a layer of the rings as they are placed in the tub in packing. Fig. III is a vertical section through a tub so packed, and Fig. IV is a vertical section through the center of the ring.

In the drawings, A represents the ring, which is made of any material (such as glass, porcelain, or earthenware) which will not be corroded or acted upon by the salt and water in which butter is usually packed, nor by the moisture of the butter; and it may be made of any suitable size and shape, whether cylindrical or polygonal, but preferably of such size as to contain about half a pound of butter, the size of the ring being, say, one and one-half inch deep and four inches in diameter; and the ring should be of sufficient thickness that its lower end may be beveled or inclined all around, from the outside upward to the inside, as shown in Fig. IV. These rings are filled with butter, and are packed in suitable tubs, preferably of sufficient size to contain seven rings—one in the middle and six around it—as this size would be convenient to handle, a layer of salt being first placed in the bottom of the tub, or sufficient cloths to protect the butter and prevent the bottom of the lower tier or layer from absorbing any woody matter from the bottom of the tub. A cloth, s, is then placed upon this layer of rings, and another layer of rings placed on that, and so on, with a cloth, s, or pervious partition between each of the rings, until the tub is filled, and the brine is then poured into the tub, filling all the spaces between the layers of butter and the rings.

It will be seen that butter packed in this manner does not come in contact with the wood on the inside of the tub, and does not therefore absorb from the wood anything which will injure its taste or otherwise injuriously affect it; and if the lower edge of the butter in each ring only reaches or extends down to the lower edge of the inside of the ring, the outer edge of the lower ends of the rings in each layer or tier will rest upon the upper ends of the rings in the layer beneath, so that the upper and lower surfaces of the cakes of butter will have a small space between, to aid in preserving the butter in good condition.

Packed in this manner butter will remain sweet for a long time, and will have no taste whatever of the wood, as the rings protect it and operate to preserve it sweet; and when sent to market packed as above described, the dealer, in selling it in small quantities, removes a ring of the butter from the tub, and, placing a stamp on one side of the butter, forces it down hard, making the desired imprint, and, holding the ring firmly in one hand, forces the butter out of the ring in the form of a stamped ball, nicely arranged for the table.

When the butter has all been sold out of the rings by the dealer, the rings are then sent back to the manufacturer or packer.

If the manufacturer's name is stamped upon the rings, his butter then becomes known in the market, and, if properly put up and preserved, is of course sought after and in demand, and this result would be a stimulant for manufacturers to use the rings and make a good article and pack it properly.

The rings being also poor conductors of heat, the butter would be kept cooler and reach the market in much better condition and harder than when packed in tubs without the rings, in the ordinary manner.

Having thus described my invention, what I claim as new is—

1. The ring A, made from any non-corrosive material, such as glass, porcelain, or earthenware, substantially as and for the purpose herein described.

2. The combination of the packing-tub and a series of rings, A, one above another therein, substantially as and for the purpose set forth.

3. The combination of the exterior tub, the rings A, placed one upon another, and the pervious partitions $s$ between the tiers of rings, substantially as and for the purpose described.

WILLIAM W. RODGERS.

Witnesses:
GEO. D. WESTON,
WM. BATCHELDER.